July 20, 1965  L. H. BROCKLANDER  3,195,233
OFFSET DESIGN INSTRUMENT
Filed May 10, 1963  3 Sheets-Sheet 1
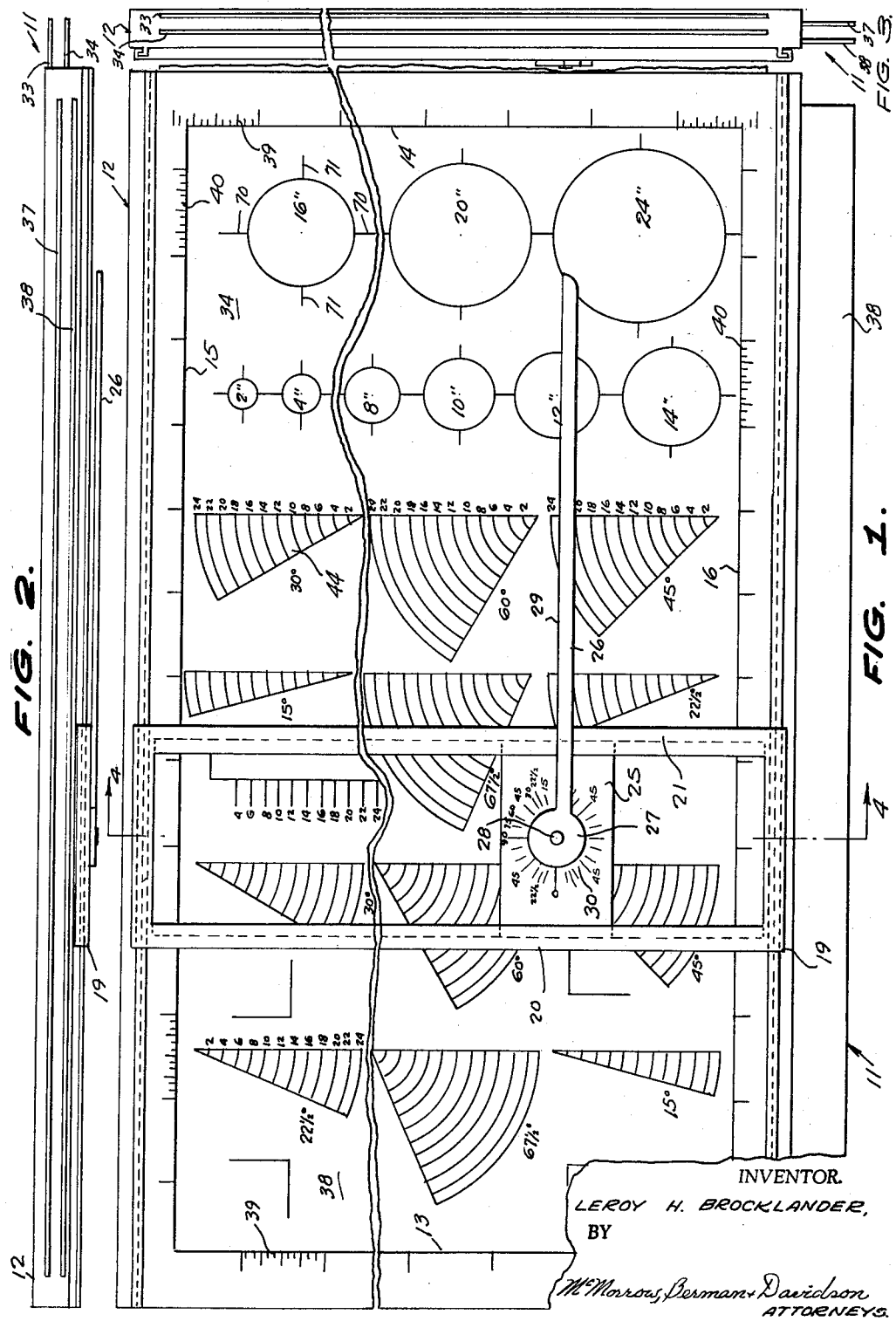
INVENTOR.
LEROY H. BROCKLANDER,
BY
McMorrow, Berman & Davidson
ATTORNEYS.

July 20, 1965   L. H. BROCKLANDER   3,195,233
OFFSET DESIGN INSTRUMENT
Filed May 10, 1963   3 Sheets-Sheet 2

INVENTOR.
LEROY H. BROCKLANDER,
BY
McMorrow, Berman & Davidson
ATTORNEYS.

July 20, 1965
L. H. BROCKLANDER
3,195,233
OFFSET DESIGN INSTRUMENT
Filed May 10, 1963
3 Sheets-Sheet 3
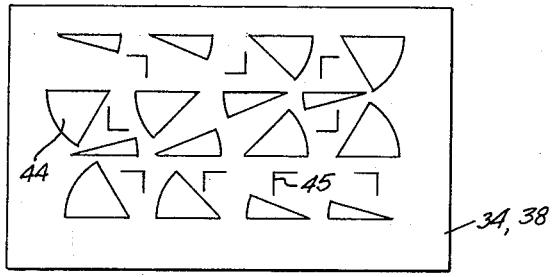
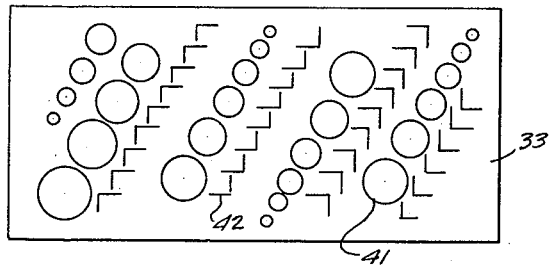
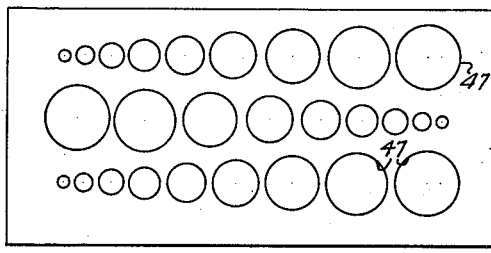
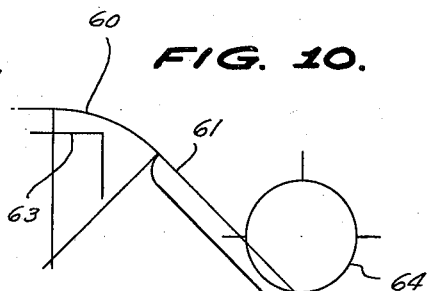
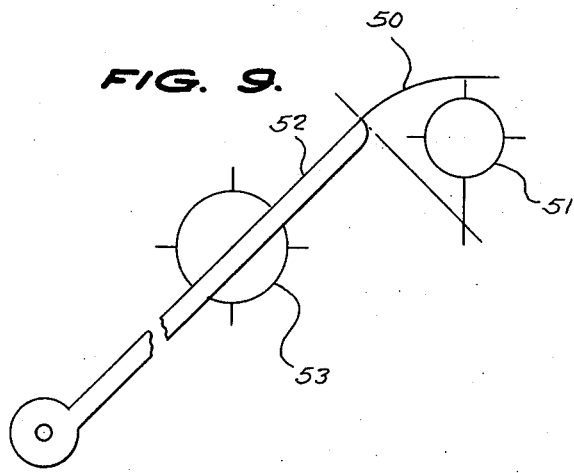
INVENTOR.
LEROY H. BROCKLANDER,
BY
McMorrow, Berman + Davidson
ATTORNEYS United States Patent Office
3,195,233
Patented July 20, 1965

3,195,233
OFFSET DESIGN INSTRUMENT
Leroy H. Brocklander, 85 Vaughn Ave., Spotswood, N.J.
Filed May 10, 1963, Ser. No. 279,406
8 Claims. (Cl. 33—1)

This invention relates to layout devices, and more particularly to devices for visually predetermining the location of pipe ducts and similar members to be installed from known data without the necessity of making drawings of the installation, and without the necessity of repeatedly revising such drawings in order to determine the proper locations and angles of the ducts or other objects to be installed.

A main object of the invention is to provide a novel and improved layout device especially useful in producing a layout of pipe ducts or similar objects to be installed from known data, the device being relatively simple in construction, being easy to operate, and eliminating the necessity of making layout drawings in order to predetermine the angles and locations of the ducts or similar objects to be installed.

A further object of the invention is to provide an improved layout device for providing the necessary information to install ducts or similar objects to be run around or over various obstructions at known locations, the device being relatively compact in size, being sturdy in construction, being easy to manipulate, and being inexpensive to fabricate.

A still further object of the invention is to provide an improved layout implement adapted to be used in the field by construction workers, such as sheet metal duct installers, pipe fitters, or the like, to predetermine the angular directions and locations of ducts or pipes to be installed without the necessity of making actual working drawings to determine this information, the device being also useful for draftsmen, engineers, or other personnel engaged in construction to determine angles and offsets in pipe duct installation and similar operations.

Further objects and advantages of the invention will become apparent from the following description and claims, and from the accompanying drawings, wherein:

FIGURE 1 is a fragentary plan view of an improved layout implement constructed in accordance with the present invention.

FIGURE 2 is a top view of the implement of FIGURE 1.

FIGURE 3 is an end elevational view of the layout implement of FIGURES 1 and 2.

FIGURE 6 is a plan view, to a reduced scale, of one of the movable plate members employed in the layout implement of FIGURES 1 to 5.

FIGURE 7 is a plan view, to a reduced scale, of another plate member employed in the layout implement.

FIGURE 8 is a plan view, to a reduced scale, of still another plate member employed in the layout implement.

FIGURE 9 is a diagrammatic sketch showing the manner in which the location of a vertical duct and associated piping may be determined, as required to clear a fixed vertical duct, and illustrating a typical method of use of the implement of FIGURES 1 to 8.

FIGURE 10 is another diagrammatic sketch illustrating the manner in which the implement of FIGURES 1 to 8 may be employed to determine the location of a vertical duct and piping connected thereto, for suitably clearing a beam or similar obstacle.

Figure 4:
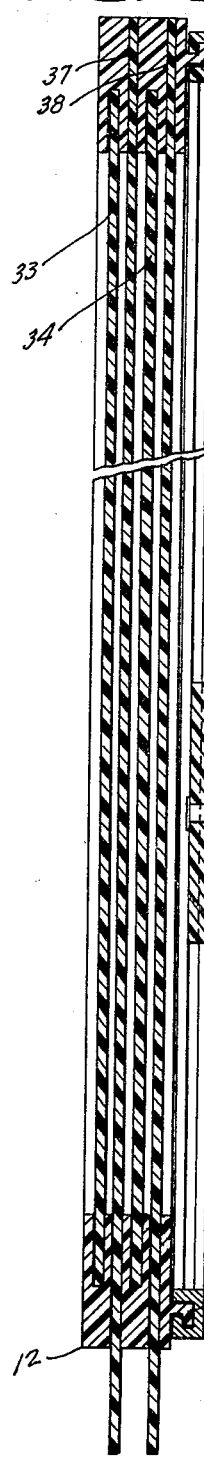
FIGURE 4 is an enlarged transverse vertical cross sectional view taken substantially on the line 4—4 of FIGURE 1.

Referring to the drawings, 11 generally designates an improved layout device constructed in accordance with the present invention. The device 11 comprises a substantially square rigid frame 12 comprising the opposing vertical side arms 13 and 14 and the opposing horizontal top and bottom arms 15 and 16, as viewed in FIGURE 1.

Figure 5:
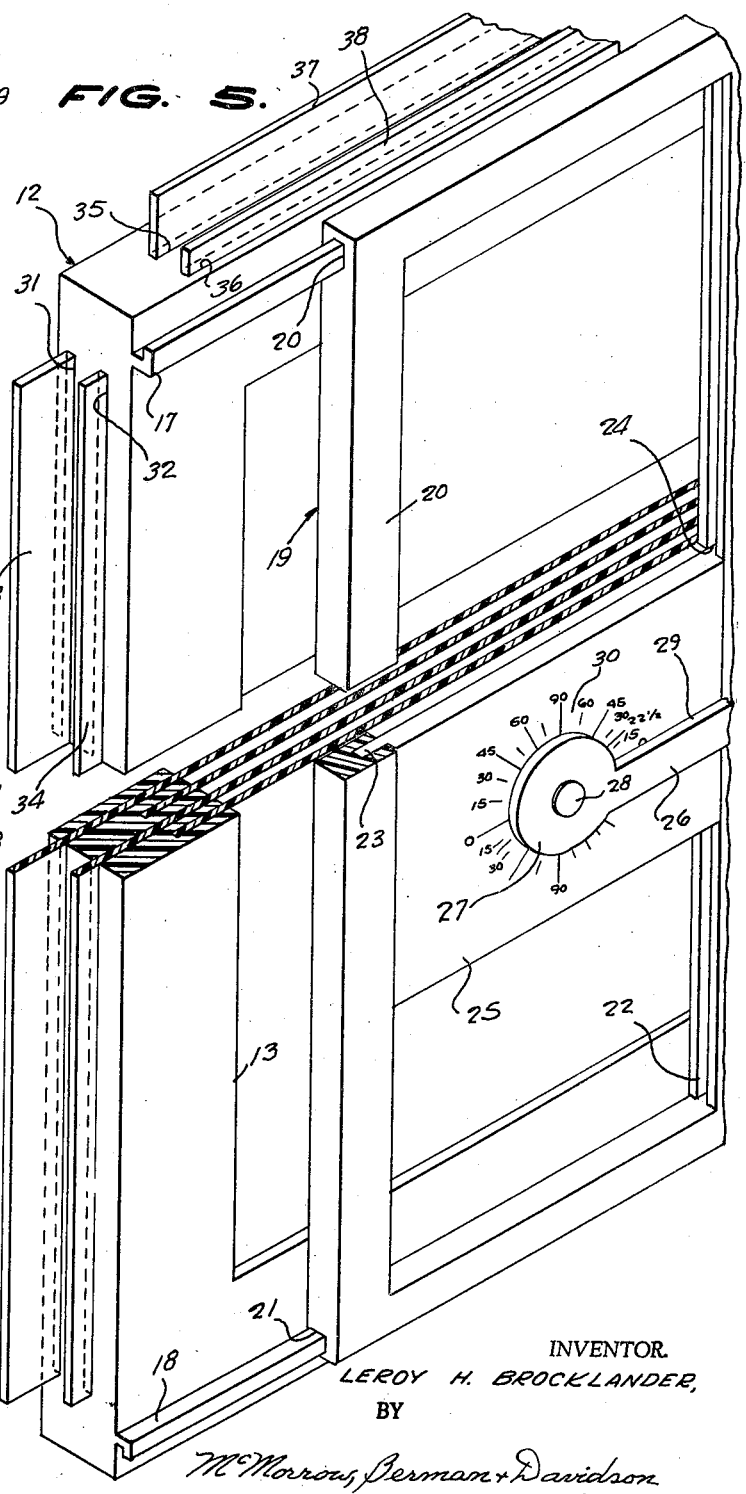
FIGURE 5 is a fragmentary enlarged perspective view of the layout implement shown in FIGURES 1, 2 and 3.

The frame 12 is integrally formed adjacent the top and bottom arms 15 and 16 and extending therealong with the respective L-shaped flange or track members 17 and 18, said members consisting of ribs having oppositely directed flanges, namely, the member 17 consisting of a rib having an upwardly directed flange and the member 18 consisting of a rib having a downwardly directed flange, as viewed in FIGURE 5. The members 17 and 18 extend parallel to each other. Designated at 19 is a rectangular frame formed with top and bottom L-shaped grooves 20 and 21 slidably receiving the L-shaped track members 17 and 18, so that the frame 19 is movable transversely between the vertical side members 13 and 14 of the main frame 12, namely, in a direction parallel to the top and bottom arms 15 and 16. The slidable frame 19 includes the respective parallel side arms 20 and 21, said side arms being formed on their inwardly facing opposing surfaces with vertical grooves 22 in which are slidably engaged the respective reduced side edge portions 23 and 24 of a rectangular plate member 25, preferably of clear transparent material, such as transparent plastic material, or the like.

Designated at 26 is an elongated pointer arm, preferably of transparent plastic material, having a circular end portion 27 which is rotatably secured at 28 to the center portion of the plate member 25, the upper edge 29 of the arm 26, as viewed in FIGURES 1 and 5, being radially directed relative to the pivotal axis defined by the pivotal connection 28. The plate member 25 is inscribed with a graduated angle scale 30 extending around the periphery of the circular portion 27 of arm 26. As shown in FIGURE 5, the angle scale 30 comprises graduated angle markings from zero to 90 degrees in four quadrants around the circular member 27. The angle markings are located outwardly adjacent the peripheral edge of member 27 enabling the angular position of the pointer edge 29 to be easily read.

The vertical arms 13 and 14 of the main frame 12 are formed with the respective pairs of slots 31 and 32 in which are received the respective transparent plate members 33 and 34, the top and bottom arms 15 and 16 of the main frame being suitably longitudinally grooved to receive the top and bottom edges of the plate members 33 and 34, whereby the plate members are slidable in a transverse direction in the main frame 12, namely, in a direction parallel to the top and bottom arms 15 and 16. The plate members 33 and 34 are of rectangular shape and are substantially longer than the square frame 12, so that portions of the members 33 and 34 always project laternally from the frame 12 to facilitate the manual adjustment of said plate members.

The top and bottom arms 15 and 16 of the main frame 12 are similarly formed with respective pairs of slots 35 and 36 in which are slidably positioned the rectangular transparent vertically movable plate members 37 and 38, the arms 13 and 14 being suitably grooved to receive the side edges of the plate members 37 and 38 and to cooperate with the pairs of slots 35 and 36 to guide the plate members for vertical adjustment, as viewed in FIGURES 1 and 5. As shown in FIGURE 4, the plate members 37 and 38 alternate with the plate members 33 and 34, the plate member 33 being rearmost, the plate member 37 being located between the plate members 33 and 34, and the plate member 38 being foremost. The plate members 37 and 38 are substantially identical in size and shape with the plate members 33 and 34, although normally positioned transverse to plate members 33 and 34, for example, as shown in FIGURE 5, so that said plate members may be interchanged, if so desired, and in order to meet the requirements of any particular situation.

As previously mentioned, the respective plate members 33, 34, 37 and 38 are of clear transparent plastic material. The inner marginal portions of the respective arms 13 and 14 of main frame 12 are calibrated with distance scale markings 39, and the inner marginal portions of the top and bottom arms 15 and 16 are similarly calibrated with distance scale markings 40, the markings 39 and 40 constituting refererence coordinate scales which are arranged to represent corresponding distances, the calibrations being to a suitable scale, for example, to the scale of three-quarters of an inch being equivalent to one foot, or any other suitable scale.

The plate member 33 is inscribed with a series of rows of symbols of graduated size representing the cross sections of vertical obstructions, for example, circular ducts or columns or rectangular vertical columns or beams. Thus, a number of spaced rows of circular symbols 41 are provided on plate member 33, the symbols being graduated in size along the rows and being to the same scale as the calibrations 39 and 40. Also inscribed on the plate member 33 are rows of right angle symbols 42 which may be also graduated in size. The various rows of symbols on the plate member 33 are arranged substantially parallel to each other and extending in inclined directions, as shown. As shown in FIGURE 7, the sizes of the symbols inscribed on the plate member 33 vary over a relatively wide range, and correspond substantially to standard sizes of conduits which may be found in existing structures. Thus, if the coordinates are of an existing duct or other obstruction in a given rectangular area are known, the plate member 33 may be moved in the main frame 12 to a position such that a symbol thereon representing the same sized obstruction as the existing one may be placed at a location in the frame corresponding to the actual location of the existing obstruction. Thus, the member 33 may be moved laterally in the frame until the symbol representing the existing conduit or other obstruction will be located in the frame at a position corresponding to the actual coordinate position of the obstruction in the area under consideration.

The plate members 34 and 38 are provided with similar symbols, comprising groups of concentric arcs 44 graduated in radius, the arcs of the respective groups subtending predetermined elbow angles, as shown in FIGURE 1. Thus, the groups of arcs 44 subtend angles corresponding to standard elbow sizes, such as 30°, 60°, 45°, or the like, and the concentric arcs are graduated at intervals corresponding to 2 inch intervals, to the same scale as the calibrations 39 and 40.

The plate members 34 and 38 may be also inscribed with spaced symbols of right angle shape, shown at 45, and representing vertical obstructions or beams.

The groups of concentric arcs, representing standard elbow angles, are arranged in various different orientations corresponding with those which might be encountered in practice.

The plate member 37 is provided with longitudinally extending rows of circular symbols 47, graduated in size, and representing standard sizes of vertical ducts or conduits. The rows of symbols 47 are arranged on parallel longitudinal axes and a plurality of such rows are provided, spaced from each other by similar vertical intervals.

In the arrangement shown in FIGURE 5, the rectangular plate members 33 and 34 are arranged for horizontal adjustment in the direction of their lengths frame 12, whereas the rectangular plate members 37 and 38 are arranged for vertical adjustment in the direction of their lengths in said frame. However, the plate members may be interchanged, as required by a particular situation.

FIGURE 9 diagrammatically illustrates how the device may be employed to locate and determine the angular size of an elbow 50 required to clear a vertical duct or conduit 51 whose location is known and to connect a line 52 extending from the elbow 50 to a vertical duct 53 to be installed. In using the device, the plate member 33 is first positioned so that a circular symbol 41 corresponding to the size of the existing vertical duct 51 is located in the frame by means of the coordinate calibrations 39 and 40 at the position having the same coordinates as the duct 51 in the area being considered. Thus, the symbol 41 is selected from one of the rows appearing on plate member 33 such that the circular symbol of proper size, corresponding to the size of the existing duct 51, is substantially at the same coordinate point along the scale 39 as is the duct 51 in the rectangular area being considered. This area is established by selecting a fixed reference point in the actual area containing the existing duct 51, which corresponds to the zero intersection point of scales 39 and 40. Since the sizes of the duct symbols 41 on the plate member 33 vary in a longitudinal direction as well as along the direction of the rows of duct symbols, as will be apparent from FIGURE 7, it is possible to make a selection visually of a proper sized symbol 41 at the proper coordinate location on plate member 33 with reference to scale 39. The plate member 33 is then moved laterally, namely, parallel to the arms 15 and 16 to bring the visually selected symbol to a position along scale 40 corresponding to the actual horizontal coordinate position of the existing duct 51 in the area under consideration. This locates the visually selected duct 41 in the frame 12 so that it is at a position corresponding to its actual position in the area under consideration.

The next step is to adjust the plate member 37 to a position to place a visually selected circular symbol 47 thereon corresponding to the size of the intended duct 53 at a position corresponding to the intended position of the duct 53 in the area under consideration.

The next step is to adjust the plate member 34 (or 38) to a position wherein a selected concentric group of arcs 44 is concentric with the symbol representing the circular cross section 51, namely, the selected symbol 41 on plate member 33, the arcs being of suitable angular size so as to be tangent with the edge 29 of the pointer arm 26 when the pointer arm is set to the position shown in FIGURE 9. In the installation represented by FIGURE 9, it is intended that the line to be run be connected substantially radially to the supply duct 53, so that the pointer arm 26 will be correspondingly positioned. However, suitable clearance must be provided to pass the obstruction 51, and it is therefore necessary to determine the angle and size of the elbow 50 to be installed. This is done by finding the arc from one of the groups 44 which will have sufficient radius to provide the necessary clearance and will also terminate substantially tangential to the pointer edge 29 when the pointer is arranged so that its edge 29 passes through the center of the symbol representing the supply conduit 53. The selection of the arc is governed by the diameter of the line to be run, since in order to provide the necessary clearance around the obstruction 51, this must be considered. The radius of the conduit to be run is therefore added to the radius of the obstruction 51 to establish the minimum elbow arc which can be employed. Having determined the minimum arc radius, an arc of this radius from one of the groups 44 is then placed in a position such that its termination is substantially tangential to the radial pointer edge 29, and when this arc is found, the angular size of the elbow will be determined. The proper arc may be found either from plate member 34 or plate member 38, the plate member 34 being adjustable in a horizontal direction, as viewed in FIGURE 5, and the plate member 38 being vertically adjustable, as viewed in FIGURE 5, either one being employed, depending upon which one is most suitable for finding a proper fit.

At the conclusion of the above steps, the device will give a graphical representation of the required layout, giving the necessary information to select the required elbow an dthe angle at which the duct 52 is to be run from the intended supply duct 53.

FIGURE 10 illustrates another example of the manner in which the device 11 may be employed to determine the proper elbow 60 to be connected to a duct 61 to pass the vertical beam 63 with proper clearance, the duct 61 being connected in an offset manner to a supply duct 64. The layout is made following the same procedure as above described, the plate member 33 being employed to locate an angular symbol 42 at a position in the frame 12 corresponding to the actual coordinate position of the beam 63 in the area under consideration. The intended feeder conduit 64 is then located, employing the plate member 37 and by selecting a circular symbol 47 thereon and placing said symbol at a position corresponding to the desired coordinate position of the feeder duct 64. The plate member 34 (or 38) is then employed in conjunction with the pointer arm 26 to locate a suitable arc from one of the groups 44 which will be tangent to the radial edge 29 of the pointer arm and which will have the proper radius to provide the desired clearance of the obstruction 63. The required radius is first calculated, in the manner above described, knowing the size of the duct 61 to be run and then the proper group 44 is found, namely, one in which the selected arc will be tangent to the edge 29 of pointer 26 when the pointer is set to a position corresponding to the position at which the line 61 will be connected to the duct 64, namely, in the offset position illustrated in FIGURE 10, as an example. When the required arc is found, providing the layout of FIGURE 10, this provides necessary information to show the required angular size of the elbow and its radius.

As in the case of the layout of FIGURE 9, the layout of FIGURE 10 gives a graphical representation from which all the necessary information can be obtained to accomplish the intended installation, without the necessity of making any drawings, and providing assurance that proper clearance will be obtained to enable the line to pass the obstacle 63.

It will be readily apparent that the device may be employed to lay out many other different arrangements and to provide the necessary information to determine required angular size and radius of elbows and the direction in which duct lines should be run to clear known obstructions. Other problems may be solved, for example, those which are inverse to the ones illustrated in FIGURES 9 and 10, namely, where the locations of lines and elbows are known and it is desired to place objects in position which will not interfere with such lines or elbows.

As above mentioned, all of the plate members 33, 34, 37 and 38 are preferably made of transparent material, such as transparent plastic material. All the various other parts of the device are also preferably made of transparent plastic material except the main frame 12.

In ordinary use, only three of the plate members will be required, and either the plate member 34 or the plate member 38 may be omitted. However, where there are two obstructions to be cleared, it will be necessary to employ the plate members 34 and 38.

Preferably the circular and right angle symbols and other designs on the plate members should be different in color for the various plate members. The angle scale 30 on the plate member 25 may be black, whereas the symbols on the respective plate members 33, 34, 37 and 38 are preferably of different distinctive colors.

To facilitate the accurate positioning of the circular symbols relative to the coordinate scales 39 and 40, said symbols may be provided with diametrically opposed pairs of radial markings 70, 70 and 71, 71, extending respectively parallel to scale 39 and scale 40. The pointer arm 26 may be employed in conjunction with these markings to locate the centers of the circular symbols relative to the scales 39 and 40.

While a specific embodiment of an improved layout device for use in installing pipes, ducts, or similar objects in structures has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A conduit layout device comprising a closed polygonal main frame having longitudinal and transverse end arms disposed substantially at right angles to each other, said arms being provided with linear distance scales, an auxiliary frame transversely disposed over said main frame, means slidably connecting said auxiliary frame to said longitudinal arms, a support member, means slidably connecting said support member to said auxiliary frame for adjustment parallel to said transverse end arms, a pointer arm pivotally connected to said support member and being adapted to overlie a portion of said main frame, a first plate member slidably mounted on said main frame and being inscribed with at least one row of symbols of graduated size representing the cross section of vertical objects, and a transparent second plate member slidably mounted on said main frame parallel to and overlying said first plate member and being inscribed with groups of concentric arcs graduated in radius, the arcs of the respective groups subtending predetermined elbow angles, whereby the first plate member may be positioned to place a symbol thereof at a predetermined coordinate position on said frame, and the second plate member may be positioned with a group of concentric arcs arranged concentrically with the symbol, and whereby the pointer arm may be arranged tangent to an arc of the group.

2. A conduit layout device comprising a closed polygonal main frame having longitudinal and transverse end arms disposed substantially at right angles to each other, said arms being provided with linear distance scales, an auxiliary frame transversely disposed over said main frame, means slidably connecting said auxiliary frame to said longitudinal arms, a support member, means slidably connecting said support member to said auxiliary frame for adjustment parallel to said transverse end arms, a pointer arm pivotally connected to said support member and being adapted to overlie a portion of said main frame, a first rectangular plate member inscribed with at least one row of symbols of graduated size representing the cross sections of vertical obstructions, and a transparent second rectangular plate member inscribed with groups of concentric arcs graduated in radius, the arcs of the respective groups subtending predetermined elbow angles, the plate members being of the same width, said main frame being provided on its arms with guideways extending longitudinally and transversely and dimensioned to slidably receive the plate members for either longitudinal or transverse adjustable positioning on the main frame and with the second plate member in overlying relationship to the first plate member, whereby the first plate member may be positioned to place a symbol thereof at a predetermined coordinate position on said frame, and the second plate member may be positioned with a group of concentric arcs arranged concentrically with the symbol, and whereby the pointer arm may be arranged tangent to an arc of the group.

3. A conduit layout device comprising a closed polygonal main frame having longitudinal and transverse end arms disposed substantially at right angles to each other, said arms being provided with linear distance scales, an auxiliary frame transversely disposed over said main frame, means slidably connecting said auxiliary frame to said longitudinal arms, a support member, means slidably connecting said support member to said auxiliary frame for adjustment parallel to said transverse end arms, a pointer arm pivotally connected to said support member and being adapted to overlie a portion of said main frame, a first rectangular plate member inscribed with at least one row of symbols of graduated size representing the cross sections of vertical obstructions, a transparent second rectangular plate member inscribed with groups of concentric arcs graduated in radius, the arcs of the respective groups subtending predetermined elbow angles, and a transparent third plate member slidably mounted on said frame parallel to the first and second plate members and inscribed with at least one row of symbols of graduated size representing the horizontal cross sections of vertical conduits, the plate members being of the same width, said main frame being provided on its arms with guideways extending longitudinally and transversely and dimensioned to slidably receive the plate members for either longitudinal or transverse adjustable positioning on the main frame and with the second plate member in overlying relationship to the first plate member, whereby the first plate member may be positioned to place a symbol thereof at a predetermined coordinate position on said frame, and the second plate member being positioned with a group of concentric arcs arranged concentrically with the symbol, and whereby the pointer arm may be arranged tangent to an arc of the group.

4. A conduit layout device comprising a closed polygonal main frame having longitudinal and transverse end arms disposed substantially at right angles to each other, said arms being provided with linear distance scales, an auxiliary frame transversely disposed over said main frame, means slidably connecting said auxiliary frame to said longitudinal arms, a support member, means slidably connecting said support member to said auxiliary frame for adjustment parallel to said transverse end arms, a pointer arm pivotally connected to said support member and being adapted to overlie a portion of said main frame, a transparent first rectangular plate member inscribed with at least one row of symbols of graduated size representing the cross sections of vertical obstructions, a transparent second rectangular plate member inscribed with groups of concentric arcs graduated in radius, the arcs of the respective groups subtending predetermined elbow angles, and a transparent third plate member inscribed with at least one row of symbols of graduated size representing the horizontal cross sections of vertical objects, the plate members being of the same width, said main frame being provided on its arms with guideways extending longitudinally and transversely and dimensioned to slidably receive the plate members for either longitudinal or transversing adjustable positioning on the main frame and in overlying relationship, whereby the first plate member may be positioned to place a symbol thereof at a predetermined coordinate position on said frame, and the second plate member may be positioned with a group of concentric arcs arranged concentrically with the symbol, and whereby the pointer arm may be arranged tangent to an arc of the group and overlying a selected symbol on said third plate member.

5. A conduit layout device comprising a substantially square main frame having longitudinal and transverse end arms disposed substantially at right angles to each other, said arms being provided with linear distance scales, an auxiliary frame transversely disposed over said main frame, means slidably connecting said auxiliary frame to said longitudinal arms, a support member, means slidably connecting said support member to said auxiliary frame for adjustment parallel to said transverse end arms, a pointer arm pivotally connected to said support member and being adapted to overlie a portion of said main frame, a transparent first rectangular plate member inscribed with at least one row of symbols of graduated size representing the cross sections of vertical obstructions, a transparent second rectangular plate member inscribed with groups of concentric arcs graduated in radius, the arcs of the respective groups subtending pedetermined elbow angles, and a transparent third plate member inscribed with at least one row of symbols of graduated size representing the horizontal cross sections of vertical objects, whereby the first plate member may be positioned to place a symbol thereof at a predetermined coordinate position on said frame, and the second plate member may be positioned with a group of concentric arcs arranged concentrically with the symbol, and whereby the pointer arm may be arranged tangent to an arc of the group and overlying a selected symbol on said third plate member.

6. A conduit layout device comprising a closed polygonal main frame having longitudinal and transverse end arms disposed substantially at right angles to each other, said arms being provided with linear distance scales, an auxiliary frame transversely disposed over said main frame, means slidably connecting said auxiliary frame to said longitudinal arms, a support member, means slidably connecting said support member to said auxiliary frame for adjustment parallel to said transverse end arms, a pointer arm pivotally connected to said support member and being adapted to overlie a portion of said main frame, angle meansuring means on said support member for measuring the angular position of said pointer arm, a first plate member slidably mounted on said main frame and being inscribed with at least one row of symbols of graduated size representing the cross sections of vertical objects, and a transparent second plate member slidably mounted on said main frame parallel and overlying to said first plate member and being inscribed with groups of concentric arcs, graduated in radius, the arcs of the respective groups subtending predetermined elbow angles, whereby the first plate member may be positioned to place a symbol thereof at a predetermined coordinate position on said frame, and the second plate member may be positioned with a group of concentric arcs arranged concentrically with the symbol, and whereby the pointer arm may be arranged tangent to an arc of the group.

7. A conduit layout device comprising a substantially square main frame having longitudinal and transverse end arms disposed substantially at right angles to each other, said arms being provided with linear distance scales, an auxiliary frame transversely disposed over said main frame, means slidably connecting said auxiliary frame to said longitudinal arms, a support member, means slidably connecting said support member to said auxiliary frame for adjustment parallel to said transverse end arms, a pointer arm pivotally connected to said support member and being adapted to overlie a portion of said main frame, an angle scale on said support member arranged around the pivotal connection of the pointer arm for measuring the angular position of said pointer arm, a transparent first rectangular plate member inscribed with at least one row of symbols of graduated size representing the cross sections of vertical obstructions, a transparent second rectangular plate member inscribed with groups of concentric arcs graduated in radius, the arcs of the respective groups subtending predetermined elbow angles, and a transparent third plate member inscribed with at least one row of symbols graduated in size representing the horizontal cross sections of vertical objects, the plate members being of the same width, said main frame being provided on its arms with guideways extending longitudinally and transversely and dimensioned to slidably receive the plate members for either longitudinal or transverse adjustable positioning on the main frame and in overlying relationship, whereby the first plate member may be positioned to place a symbol thereon at a predetermined coordinate position on said frame, and the second plate member may be positioned with a group of concentric arcs arranged concentrically with the symbol, and whereby the pointer arm may be arranged tangent to an arc of the group and overlying a selected symbol on said third plate member.

8. A conduit layout device comprising a closed polygonal main frame having longitudinal and transverse end arms disposed substantially at right angles to each other, said arms being provided with linear scales, an auxiliary frame transversely disposed over said main frame, means slidably connecting said auxiliary frame to said longitudinal arms, a support member, means slidably connecting said support member to said auxiliary frame for adjustment parallel to said transverse end arms, a pointer arm pivotally connected to said support member and being adapted to overlie a portion of said main frame, a transparent first rectangular plate member inscribed with at least one row of symbols of graduated size representing the cross sections of vertical obstructions, a transparent second rectangular plate member inscribed with groups of concentric arcs graduated in radius, the arcs of the respective groups subtending predetermined elbow angles, a transparent third plate member inscribed with at least one row of symbols of graduated size representing the horizontal cross sections of vertical objects, and a transparent fourth plate member inscribed with additional groups of concentric arcs graduated in radius, the arcs of the respective groups subtending predetermined elbow angles, the plate members being of the same width, said main frame being provided on its arms with guideways extending longitudinally and transversely and dimensioned to slidably receive the plate members for either longitudinal or transverse adjustable positioning on the main frame and in overlying relationship, whereby the first plate member may be positioned to place a symbol thereof at a predetermined coordinate position on said frame, and whereby the second or fourth plate member may be positioned with a group of concentric arcs arranged concentrically with the symbol, and whereby the pointer arm may be arranged tangent to an arc of the group and overlying a selected symbol on either said first or third plate member.

References Cited by the Examiner
UNITED STATES PATENTS

| | | | |
|---|---|---|---|
| 1,773,886 | 8/30 | Stanley | 33—1 X |
| 2,068,226 | 7/35 | Buck | 33—1 X |
| 2,478,981 | 1/45 | Randall | 33—1 X |
| 2,494,536 | 3/47 | Atwood | 33—1 X |
| 2,834,110 | 5/58 | Malakoff | 33—1 |

ISAAC LISANN, *Primary Examiner.*

LEONARD FORMAN, *Examiner.*